(12) United States Patent
Cheung

(10) Patent No.: US 10,380,360 B2
(45) Date of Patent: Aug. 13, 2019

(54) SECURED FILE SHARING SYSTEM

(71) Applicant: PhazrIO Inc., Los Angeles, CA (US)

(72) Inventor: Chi-Kwan J. Cheung, Santa Monica, CA (US)

(73) Assignee: PhazrIO Inc., Los Angeles, CA (US)

( * ) Notice: Subject to any disclaimer, the term of this patent is extended or adjusted under 35 U.S.C. 154(b) by 160 days.

(21) Appl. No.: 15/469,366

(22) Filed: Mar. 24, 2017

(65) Prior Publication Data
US 2017/0286702 A1 Oct. 5, 2017

Related U.S. Application Data

(60) Provisional application No. 62/315,011, filed on Mar. 30, 2016.

(51) Int. Cl.
| | |
|---|---|
| H04L 29/06 | (2006.01) |
| G06F 7/04 | (2006.01) |
| G06F 21/60 | (2013.01) |
| G06F 21/62 | (2013.01) |
| H04L 12/58 | (2006.01) |
| G06F 21/42 | (2013.01) |
| H04W 4/14 | (2009.01) |

(52) U.S. Cl.
CPC ............ *G06F 21/606* (2013.01); *G06F 21/42* (2013.01); *G06F 21/6209* (2013.01); *H04L 51/08* (2013.01); *H04L 63/0853* (2013.01); *H04L 63/18* (2013.01); *H04L 63/0428* (2013.01); *H04W 4/14* (2013.01)

(58) Field of Classification Search
CPC .... G06F 21/606; G06F 21/42; G06F 21/6209; H04L 63/0853; H04L 63/18; H04L 51/08; H04L 63/0428; H04W 4/14

USPC ...................................... 713/165; 726/27, 30
See application file for complete search history.

(56) References Cited

U.S. PATENT DOCUMENTS

| | | | |
|---|---|---|---|
| 8,542,945 B1* | 9/2013 | Ludwig | G06K 9/52 359/29 |
| 2002/0131425 A1* | 9/2002 | Shalom | H04L 29/06 370/401 |
| 2006/0136561 A1* | 6/2006 | Lee | H04L 29/1215 709/206 |
| 2007/0177739 A1* | 8/2007 | Ganguly | H04L 12/1881 380/277 |

(Continued)

*Primary Examiner* — Aravind K Moorthy
(74) *Attorney, Agent, or Firm* — Shun Yao; Park, Vaughan, Fleming & Dowler LLP

(57) ABSTRACT

One embodiment provides a file sharing system. During operation, the system identifies a data file to be sent to a second device of a second user and generates a plurality of coded fragments from the data file based on a generator matrix of erasure encoding. An individual coded fragment does not include plaintext data. The system generates a plurality of sub-files, each of which comprises one or more coded fragments, of the data file. The system attaches a first sub-file to an electronic communication destined to the second device, uploads a second sub-file to a cloud provider, and embeds a link, which may expire and is protected based on a verification code, associated with the uploaded second sub-file into the electronic communication. The system sends the electronic communication to the second device and the verification code in a text message to a cell phone of the second user.

20 Claims, 9 Drawing Sheets

(56) References Cited

U.S. PATENT DOCUMENTS

| | | | |
|---|---|---|---|
| 2011/0125849 A1* | 5/2011 | Boyd | H04L 63/123 709/204 |
| 2012/0166992 A1* | 6/2012 | Huynh | G06F 8/70 715/771 |
| 2013/0031414 A1* | 1/2013 | Dhuse | G06F 11/0727 714/37 |
| 2013/0080772 A1* | 3/2013 | McGowan | H04L 63/0428 713/165 |
| 2014/0046906 A1* | 2/2014 | Patiejunas | G06F 21/606 707/661 |
| 2014/0189595 A1* | 7/2014 | Waldman | G06F 3/04842 715/835 |
| 2015/0288701 A1* | 10/2015 | Brand | H04L 63/102 726/7 |
| 2016/0191660 A1* | 6/2016 | Farrell | H04L 67/32 709/219 |
| 2017/0178069 A1* | 6/2017 | Paterra | G06Q 10/0832 |
| 2017/0237552 A1* | 8/2017 | Karame | H04L 9/0637 380/28 |
| 2017/0272209 A1* | 9/2017 | Yanovsky | H04L 67/1097 |
| 2018/0157853 A1* | 6/2018 | Kumar | G06F 11/1464 |

* cited by examiner

US 10,380,360 B2

SECURED FILE SHARING SYSTEM

RELATED APPLICATION

This application claims the benefit of U.S. Provisional Application No. 62/315,011, titled "Secured File Sharing System," by inventor Chi-Kwan J. Cheung, filed 30 Mar. 2016, the disclosure of which is incorporated by reference herein.

The present disclosure is related to U.S. patent application Ser. No. 15/499,664, titled "High Performance Data Redundancy and Fault Tolerance," by inventors Donald C. D. Chang, Chi-Kwan J. Cheung, Lara Dolecek, Gary N. Jin, and Rocky Chi-Ray Lin, filed Apr. 4, 2017, the disclosure of which is incorporated by reference herein.

BACKGROUND

Field

This disclosure is generally related to efficient file exchange in an electronic communication. More specifically, this disclosure is related to a method and system for facilitating secure sharing of a file using multiple communication services.

Related Art

With the advancement of computer and network technologies, various operations performed by users of different applications have led to extensive use of web services. This proliferation of the Internet and Internet-based user activity continues to increase efficiency of electronic communications, such as email or chat. For example, a user may need to share a data file with another user via electronic communication using an application (e.g., email applications running on different platforms or web-interfaces running on different browsers in different operating systems). To ensure safety, the application can use an encryption on the file based on a key (e.g., a public key or a symmetric key). However, such encryption techniques require agreement between the sender application and the recipient application. In addition, such keys can be compromised.

A user can also store the file in a cloud storage service provider (which can also be referred to as a cloud provider). A user can upload and access the file via the Internet. This "anywhere, anytime" model has made cloud providers a popular choice for data storage. The user can obtain a publicly accessible link and share the link via the electronic communication. However, since such a link is publicly accessible, if the communication is compromised, the file becomes accessible. In addition, uploading data to a cloud provider may impose limitations on the data, which can include data mining and information gathering from the stored data. As a result, if the document includes sensitive information (e.g., a Social Security number), the cloud provider may gain access to that information.

Although a number of applications and cloud providers offer file sharing services, some problems still remain in efficiently sharing a file in a secure way.

SUMMARY

One embodiment provides a file sharing system that facilitates secure file sharing by sending data files via a plurality of communication techniques. During operation, the system identifies a data file to be sent to a second device of a second user and generates a plurality of coded fragments from the data file based on a generator matrix of erasure encoding. An individual coded fragment does not include plaintext data of the data file. The system generates a plurality of sub-files, each of which comprises one or more coded fragments, of the data file. The system attaches a first sub-file of the plurality of sub-files to an electronic communication destined to the second device, uploads a second sub-file of the plurality of sub-files to a cloud provider, and embeds a link, which is protected based on a verification code, associated with the uploaded second sub-file into the electronic communication. The system sends the electronic communication to the second device and the verification code in a text message to a cell phone of the second user. The embedded link is associated with the second sub-file and may expire if the second sub-file is not retrieved within a predefined period of time.

In a variation on this embodiment, the electronic communication is one of: an electronic mail (email) and a chat message.

In a variation on this embodiment, the system determines a number of sub-files based on a number of communication techniques used to share the data file.

In a variation on this embodiment, the system discards one or more coded fragments based on a minimum number of coded fragments needed to reconstruct the data file.

In a variation on this embodiment, the system generates the plurality of coded fragments by obtaining a plurality of data elements from the data file, converting a respective data element in the plurality of data elements to a numerical representation, representing the numerical representations as a data matrix, and multiplying the data matrix with the generator matrix.

In a variation on this embodiment, the system maintains a mapping between an address of the second user and the cell phone number.

In a further variation, the system attaches a third sub-file of the plurality of sub-files to a chat message destined to a user account of the second user. The mapping then also includes the user account.

In a variation on this embodiment, the system determines a number of coded fragments for a respective sub-file based on a size of a file allowed by a corresponding communication technique.

In a variation on this embodiment, the electronic communication also includes metadata encrypted by a key. The metadata includes one or more of: a number of sub-files, a number of coded fragments in a respective sub-file, and a communication technique for a respective sub-file.

In a variation on this embodiment, the system determines whether the data file is selected as an attachment from an application facilitating the electronic communication. If the data file is selected as an attachment, the system is launched as a companion application facilitating the secure file sharing.

One embodiment provides a file sharing system that facilitates secure file sharing by receiving data files via a plurality of communication techniques. During operation, the system obtains a first sub-file of a data file, which represents a portion of the data file, from an electronic communication sent from a second device of a second user. The system identifies a link, which is protected based on a verification code, associated with a second sub-file of the data file from the electronic communication. This second sub-file is uploaded to a cloud provider. The system obtains the verification code from the first user. The verification code can be sent to a cell phone number of the first user. The system obtains the second sub-file from the cloud provider by providing the verification code to a portal. The link in the electronic communication leads to the portal. The system retrieves a plurality of coded fragments of the data file from the first and second sub-files. It should be noted that an individual coded fragment does not include plaintext data of the data file. The system then reconstructs the data file from the plurality of coded fragments based on a decoder matrix of erasure encoding. The decoder matrix is determined based on a generator matrix used to generate the plurality of coded fragments.

In a variation on this embodiment, the electronic communication is one of: an electronic mail (email) and a chat message.

In a variation on this embodiment, the system reconstructs the data file by determining matrix elements associated with the plurality of coded fragments, determining the decoder matrix by forming the sub-matrix of the generator matrix based on a transformation of the determined matrix elements, and multiplying the decoder matrix with a data matrix comprising the plurality of coded fragments.

In a variation on this embodiment, the system obtains a third sub-file of the data file from a chat message destined to a user account of the first user.

In a variation on this embodiment, the electronic communication also includes metadata encrypted by a key. The metadata includes one or more of: a number of sub-files, a number of coded fragments in a respective sub-file, and a communication technique for a respective sub-file.

In a variation on this embodiment, the system determines whether the first sub-file is selected for downloading from an application facilitating the electronic communication. If the first sub-file is selected for downloading, the system is launched as a companion application facilitating the secure file sharing.

In a variation on this embodiment, the portal is a plug-in of the cloud provider or a web portal running on a web server. The plug-in can be configured to verify the verification code for the second sub-file. The web portal can be configured to forward a download request for the second sub-file to the cloud provider in response to verifying the verification code.

In a variation on this embodiment, the verification code is associated with an expiration time.

BRIEF DESCRIPTION OF THE FIGURES

In the figures, like reference numerals refer to the same figure elements.

DETAILED DESCRIPTION

Figure 1A:
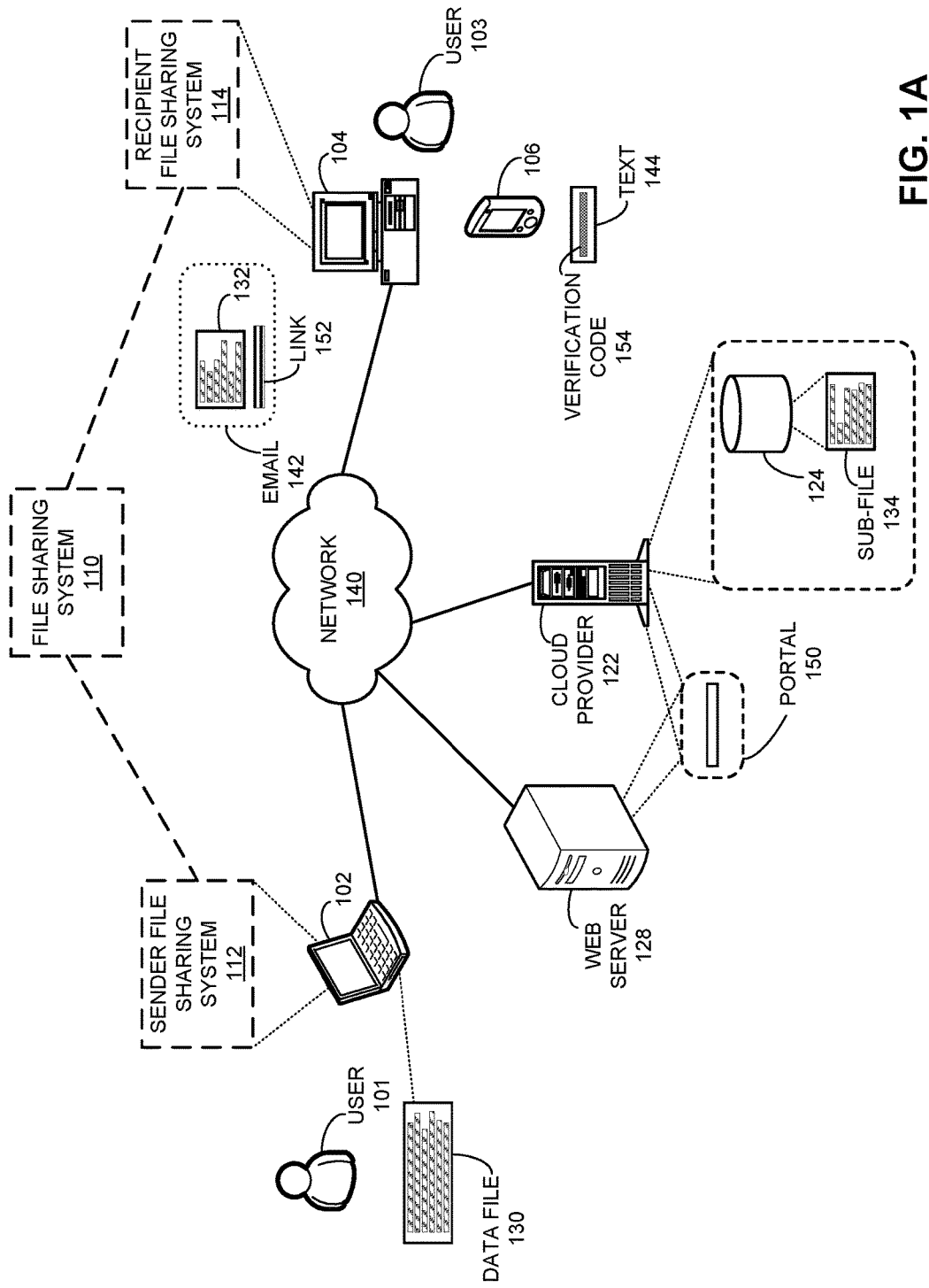
FIG. 1A illustrates an exemplary file sharing system facilitating secure file sharing using multiple communication services, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

In embodiments of the present invention, the problem of efficiently and securely sharing a data file is solved by generating a plurality of sub-files and sharing a respective sub-file via different communication services. For example, one of the sub-files can be sent via an electronic communication (e.g., an email or a chat service) and another sub-file can be shared via a cloud provider (CP). Any service provider that allows a user to upload, access, and edit a file to cloud storage provided by the service provider can be referred to as a cloud provider.

With existing technologies, a user typically shares a file as an attachment to an electronic communication. Some application facilitating the electronic communication may use encryption to ensure security of the file. However, using an encryption key remains a single point of vulnerability. If an adversary can obtain the key, the security of the file can be compromised. The user can also use a cloud provider, which allows the user to upload and store the file, to share the file via the electronic communication. However, under such circumstances, the file may become publicly accessible. In addition, the file may become subject to data mining and information gathering by the cloud provider. As a result, if the file includes sensitive information about the user, the cloud provider may gain access to that information.

To solve this problem, embodiments of the present invention provide a file sharing system that splits a file into multiple sub-files and use different communication services to share a respective sub-file. For a file sharing session, two instances of the file sharing system can operate. The sender file sharing system is the instance running on a user device of the user that wishes to send the file. On the other hand, the recipient file sharing system is the instance running on a user device of the user that is the intended recipient of the file. In this disclosure, the phrase "the file sharing system" or "the system" can refer to the instance of relevance. For example, if the phrase "the system" is used from the sender's perspective, the phrase refers to the sender file sharing system.

During operation, the sender file sharing system generates a plurality of coded fragments of the file to be shared and uses the coded fragments to generate at least two sub-files. A respective sub-file can include one or more coded fragments. Suppose that the file sharing system uses an email as the electronic communication service. The sender file sharing system sends one sub-file as an attachment of an email and uploads another sub-file to a cloud provider. To upload the sub-file, the user can provide the credentials for the cloud provider to the sender file sharing system. The email can include a link associated with the uploaded sub-file. In some embodiments, the sender file sharing system can also send a verification code via a text message to the cell phone (or any other device capable of receiving a text) of the recipient.

Upon receiving the email, the recipient file sharing system retrieves the attached sub-file and obtains the link from the email. The recipient file sharing system then executes the link to reach a portal that prompts for the verification code. This portal can be a web portal running on a web server or a verification plug-in running on the cloud server. The recipient provides the verification code to the portal. Upon verification, the portal initiates the download of the other sub-file to the recipient file sharing system. The recipient file sharing system then combines the sub-files (e.g., the coded fragments of the file) to obtain the original file.

The original data file can be reconstructed without data loss using a subset of the coded fragments. The number of coded fragments required for the reconstruction can be configurable. In some embodiments, the sender file sharing system can use numerical operation-based erasure coding to generate the coded fragments. For example, in a (6,4) erasure-coding-based system, the original data is encoded into 6 coded fragments. The recipient file sharing system can use any 4 of the coded fragments to retrieve the original data. To ensure the security of the file, the sender file sharing system can discard two coded fragments and send only 4 coded fragments to recipient file sharing system 112. It should be noted that it is also possible to use a (4, 4) erasure-coding-based system such that all four coded fragments are needed to retrieve the original data. Since an individual coded fragment does not disclose any plaintext data, even without additional encryption, neither the email nor the cloud storage of the user reveals the contents of the original file.

In some embodiments, the system uses numerical operations to efficiently perform encoding and decoding, and makes an erasure-coding-based approach suitable for data streams. The system obtains a number of bits from the data file and represents the bits in a numerical representation as a data element. The system then forms a data matrix comprising a plurality of such data elements in corresponding numerical representations and determines a generator matrix for the data matrix. The system multiplies the data matrix and the generator matrix to generate the coded fragments.

The numerical operation-based erasure coding represents user data in numerical presentations, such as integers, doubles, big integers, floating points, decimal floating points, etc., instead of using a Galois field lookup matrix. The system can use a subset of coded fragments and a corresponding decoder matrix to retrieve the data elements. The decoder matrix corresponds to the sub-matrix that has been used to generate the subset of coded fragments. If one or more of the coded fragments become unavailable (e.g., becomes corrupted), the system uses a subset of coded fragments to reconstruct the corrupted coded segments based on a recovery matrix. It should be noted that the decoder matrix and recovery matrix can be obtained from a transformation of the corresponding sub-matrix of the generator matrix (e.g., based on an inverse operation on the sub-matrix).

File Sharing System

FIG. 1A illustrates an exemplary file sharing system facilitating secure file sharing using multiple communication services, in accordance with an embodiment of the present invention. In this example, users 101 and 103 use user devices 102 and 104, respectively, communicating with each other via a network 140. Network 140 can be a local or a wide area network, or the Internet. A user device can be any device that can access a cloud provider via network 140 (e.g., a tablet, a smartphone, a computer, etc.). User 101 can also maintain an account with a cloud provider 122, which provides cloud storage 124 to user 101. Cloud storage 124 can indicate the portion of cloud storage (e.g., 5 gigabytes of storage) dedicated for user 101 on the storage devices of cloud provider 122. Examples of a cloud provider include, but are not limited to, Google Drive, Microsoft OneDrive, Dropbox, and Box.

With existing technologies, if user 101 wishes to send a file 130 on device 102 to user 103, user 101 can attach file 130 to an email using an email application running on device 102. To ensure security for file 130, the application can apply encryption (e.g., a public key, a symmetric key, or a quantum key) to file 130. However, using an encryption key remains a single point of vulnerability. If an adversary can obtain the key, the security of file 130 can be compromised. User 102 can also upload file 130 to cloud provider 122, which stores file 130 in cloud storage 124. User 101 can include a link to file 130 in cloud storage 124 in the email and send the email to user 103. However, user 101 then has to enable public access to file 130. If an adversary gains access to the email, the adversary can gain access to file 130. In addition, file 130 may become subject to data mining and information gathering by cloud provider 122. As a result, if file 130 includes sensitive information about user 101, the cloud provider 122 may gain access to that information.

To solve this problem, embodiments of the present invention provide a file sharing system 110 that splits file 130 into multiple sub-files 132 and 134. An individual sub-file does not include any plaintext data. Hence, without obtaining both sub-files 132 and 134, an adversary may not gain access to file 130. To share file 130, two instances of file sharing system 110 can operate. Sender file sharing system 112 is the instance running on device 102 of user 101 wishing to send file 130. On the other hand, recipient file sharing system 114 is the instance running on device 104 of user 103, which is the intended recipient. In this disclosure, file sharing system 110 or system 110 can refer to the instance of relevance. For example, if the phrase "system 110" is used from user 101's perspective, system 110 refers to sender file sharing system 112. Similarly, if the phrase "system 110" is used from user 103's perspective, system 110 refers to recipient file sharing system 114.

To ensure security of file 130, sender file sharing system 112 sends sub-file 132 via an email 142 and uploads sub-file 134 to cloud storage 124 of cloud provider 122. To upload sub-file 134, user 101 can provide the credentials for cloud provider 122 to sender file sharing system 112. As a result, gaining access to one form of communication does compromise file 130. Email 142 can include a link 152 associated with sub-file 134. This link can be a link to sub-file 134 with access permission. However, unlike a public link, link 152 can be protected by a verification code provided to user 103 via a secondary communication medium. In some embodiments, sender file sharing system 112 also sends a verification code 154, which facilitates access to sub-file 134, via a text message 144 to a cell phone 106 (or any other device capable of receiving a text) of user 103. Here, cell phone 106 operates as the secondary communication medium.

Recipient file sharing system 114 uses link 152 to reach a portal 150, which prompts for a verification code. Portal 150 can be a web portal running on a web server 128 or a verification plug-in running on the server of cloud provider 122. User 103 provides verification code 154 to portal 150. Upon verification, recipient file sharing system 114 retrieves sub-file 134 from cloud provider 122. If portal 150 runs on web server 128, portal 150 can obtain sub-file 134 using verification code 154 and send sub-file 134 to recipient file sharing system 114. On the other hand, if portal 150 runs on cloud provider 122, upon receiving verification code 154, cloud provider 122 can send sub-file 134 to recipient file sharing system 114. Here, user 103 has to authenticate the email application on device 104 (e.g., using a Gmail or Yahoo account password) to access sub-file 132 and provide verification code 154 to access sub-file 134. In this way, recipient file sharing system 114 provides multi-phase authentication to ensure the security of file 130. Recipient file sharing system 114 then re-assembles sub-files 132 and 134 to obtain file 130.

Figure 1B:
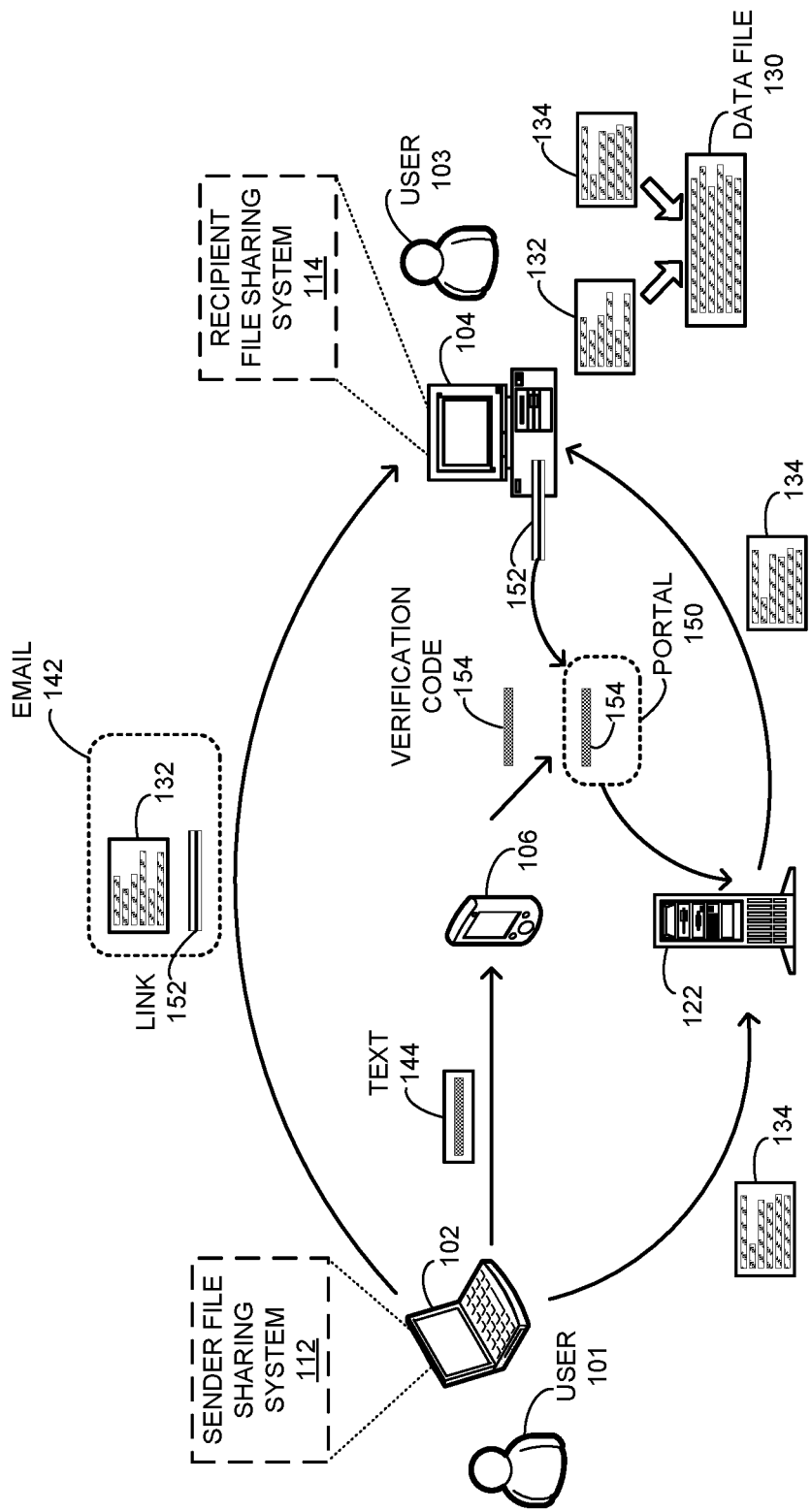
FIG. 1B illustrates an exemplary file sharing of a storage management system using multiple communication services, in accordance with an embodiment of the present invention.

FIG. 1B illustrates an exemplary file sharing of a storage management system using multiple communication services, in accordance with an embodiment of the present invention. User 101 can send email 142 using an email application, which can be a service application running on the operating system (e.g., Microsoft Outlook) or a web interface (e.g., Gmail or Yahoo mail) running on a browser. Sender file sharing system 112 can operate as a plug-in of the email application on device 101 and can be launched if user 101 attaches a file.

During operation, user 101 attaches file 130 to an email 142, which triggers sender file sharing system 112. Sender file sharing system 112 generates a plurality of coded fragments of file 130 to be shared and uses the coded fragments to generate sub-files 132 and 134. In some embodiments, sender file sharing system 112 only includes the minimum number of coded fragments needed to reconstruct file 130 in sub-files 132 and 134. These operations of sender file sharing system 112 can be hidden from user 101 (e.g., user 101 may attach file 130 to email 142 without realizing sender file sharing system 112 is facilitating secure file sharing using sub-files 132 and 134). A respective one of sub-files 132 and 134 can include one or more coded fragments. Sender file sharing system 112 attaches sub-file 132 to email 142. Sender file sharing system 112 uploads sub-file 134 to cloud provider 122. Sender file sharing system 112 obtains link 152 that leads to sub-file 134 via portal 150.

Portal 150 can be protected by verification code 154. In other words, portal 150 can be a temporary portal with no username and verification code 154 as the "password." In some embodiments, verification code 154 is associated with an expiration time. When the time expires, verification code 154 can no longer be used to obtain sub-file 134. If verification code 154 expires for some reason, recipient file sharing system 114 can request sender file sharing system 112 for a new verification code. Sender file sharing system 112 then can generate a new link and a new verification code for sub-file 134. Sender file sharing system 112 embeds link 152 in email 142 (e.g., either in the body or as control information) and instructs the email application of device 101 to send email 142 to the email address of user 103.

Sender file sharing system 112 sends a verification code 154 via text message 144 to cell phone 106. Sender file sharing system 112 can obtain the number of cell phone 106 from an address book that maps the email address of user 103 to the number. If the cell phone number is not in the address book, upon detecting recipient's email address, sender file sharing system 112 can prompt the user to provide the number of cell phone 106. Using multiple communication services (e.g., email and text), sender file sharing system 112 ensures that gaining access to one of the communication techniques, or to one of the user devices, such as device 104 and cell phone 106, would not result in compromising file 130.

User 103 can receive email 142 using an email application. If user 103 chooses to download sub-file 132 from the attachment, recipient file sharing system 114 can be launched on device 104 as a companion application. In some embodiments, recipient file sharing system 114 detects a flag in email 142 and determines that the attachment is a secured attachment and distributed to multiple sub-files. Examples of the flag include, but are not limited to, sender's email address, device 102's address and/or domain, presence of link 152, and a key phrase embedded in email 142 by sender file sharing system 112.

Upon determining that email 142 includes a secured attachment, recipient file sharing system 114 retrieves sub-file 132 and link 152 from email 142. Recipient file sharing system 114 then executes link 152 to reach portal 150. Portal 150 prompts user 103 for a verification code (e.g., using a pop-up window). User 103 provides verification code 154 received on cell phone 106 to portal 150 via the user prompt. This causes cloud provider 122 to push sub-file 134 to recipient file sharing system 114. Recipient file sharing system 114 combines the coded fragments of sub-files 132 and 134 (e.g., using decoding method of erasure coding) to retrieve file 130. For the convenience of user 103, recipient file sharing system 114 can instruct the email application of device 104 to present file 130 to be downloaded.

Distributed File Sharing

Figure 1C:
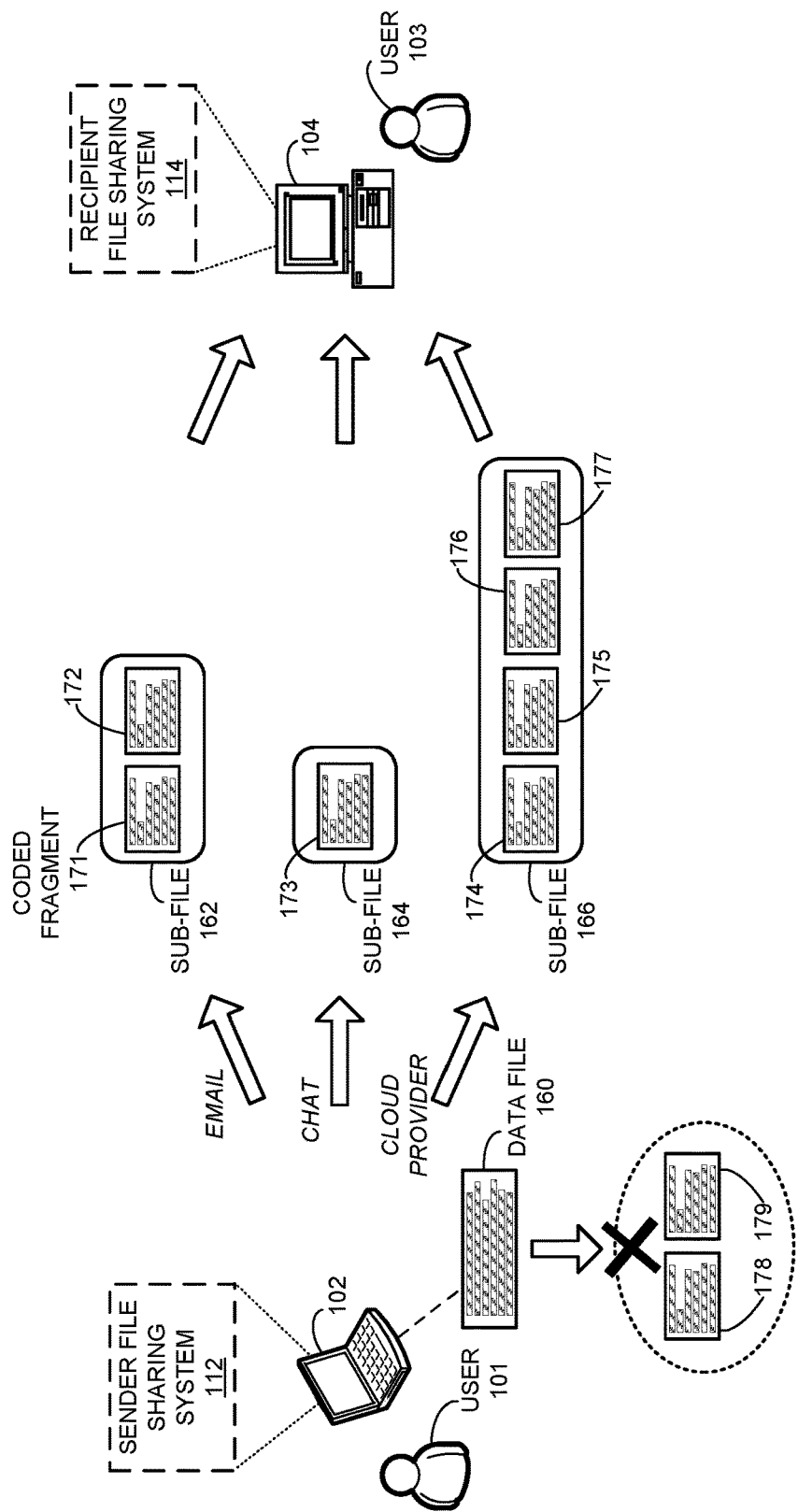
FIG. 1C illustrates exemplary sub-files shared by a storage management system using multiple communication services, in accordance with an embodiment of the present invention.

FIG. 1C illustrates exemplary sub-files shared by a storage management system using multiple communication services, in accordance with an embodiment of the present invention. In this example, user 101 sends data file 160 to user 103 using multiple communication services, such as an email, a chat service, and a cloud provider. A chat service can be any application or service that can facilitate chatting among two or more participants using any combination of text, voice, and video (e.g., Google Hangout or Skype). User 101 can use more than one chat service.

During operation, sender file sharing system 112 generates a plurality of coded fragments 171, 172, 173, 174, 175, 176, 177, 178, and 179 of file 160. In some embodiments, sender file sharing system 112 uses numerical-operation-based erasure coding to generate the coded fragments. Sender file sharing system 112 can determine that the minimum number of coded fragments needed to reconstruct data file 160 is seven. Sender file sharing system 112 then discards coded fragments 178 and 179 (denoted with a cross), and shares only coded fragments 171, 172, 173, 174, 175, 176, and 177 to recipient file sharing system 114. It should be noted that sender file sharing system 112 may not discard coded fragments 178 and 179, and may include such additional coded fragments in the sub-file for the cloud provider.

Sender file sharing system 112 determines a number of sub-files for file 160 based on the number of communication services. In this example, the number of communication services is three. Therefore, sender file sharing system 112 determines the number of sub-files to be three. User 101 can configure sender file sharing system 112 to indicate the communication services. As a result, if user 101 attaches a file in an email or sends a file via the chat service, device 102 launches sender file sharing system 112 as a companion application and initiates secure file sharing using the communication services specified by user 101. In some embodiments, a file sharing system includes at least two default communication services (e.g., an email and a cloud provider).

Sender file sharing system 112 then distributes coded fragments 171, 172, 173, 174, 175, 176, and 177 into three sub-files 162, 164, and 166. This allocation can be determined based on the size of an attachment (e.g., in bytes) allowed by a communication technique. In some embodiments, the size of a coded fragment can be limited by the minimum of the sizes of attachment allowed by the communication services. For example, if the size of attachment allowed by the chat service can accommodate the size of one coded fragment, sender file sharing system 112 allocates coded fragment 173 to sub-file 164, which can be sent via the chat service. Similarly, if the size of attachment allowed by the email service can accommodate the size of two coded fragments, sender file sharing system 112 allocates coded fragments 171 and 172 to sub-file 162, which can be sent via the email service.

Sender file sharing system 112 can retrieve the account information of the chat service associated with user 104 based on the sender email address. Similarly, sender file sharing system 112 can retrieve the email address of user 104 based on the account information of the chat service associated with user 104. Furthermore, as described in conjunction with FIG. 1B, the email address can be mapped to the cell phone number of user 104. Therefore, sender file sharing system 112 can maintain a mapping between the email address, the chat service's account information, and the cell phone number of user 104. Any one of these mapping elements can point to the others.

Since a cloud provider allows a large file to be uploaded and shared, the size of sub-file 166, which can be shared via the cloud provider, may not be constrained. Hence, sender file sharing system 112 allocates the rest of the coded fragments 174, 175, 176, and 177 to sub-file 166. Upon receiving sub-files 162, 164, and 166, recipient file sharing system 114 obtains coded fragments 171, 172, 173, 174, 175, 176, and 177, and reconstructs file 160 from these coded fragments. If additional coded fragments 178 and 179 are included in sub-file 166, recipient file sharing system 114 can choose any seven coded fragments to reconstruct file 160 and discard the rest.

In this way, file sharing system 110 facilitates keyless security in the process of file sharing. For example, sender file sharing system 112 secures file 160 by dividing file 160 into a plurality of coded fragments and sending the coded fragments using multiple communication services. These coded fragments can be stored in multiple locations and transmitted using different paths. To further enhance the security of file 160, sub-files 162, 164, and 166 or their names may not include information that can identify the relevant coded fragments for reassembly. In some embodiments, each of sub-files 162, 164, and 166 is assigned a unique identifier (e.g., a randomly generated universally unique identifier (UUID)). In some embodiments, sender file sharing system 112 can apply additional security hashing on a respective coded fragment or a respective sub-file, thereby ensuring that the hashed segment of file 160 has not been altered.

Numerical Representation

Figure 2:
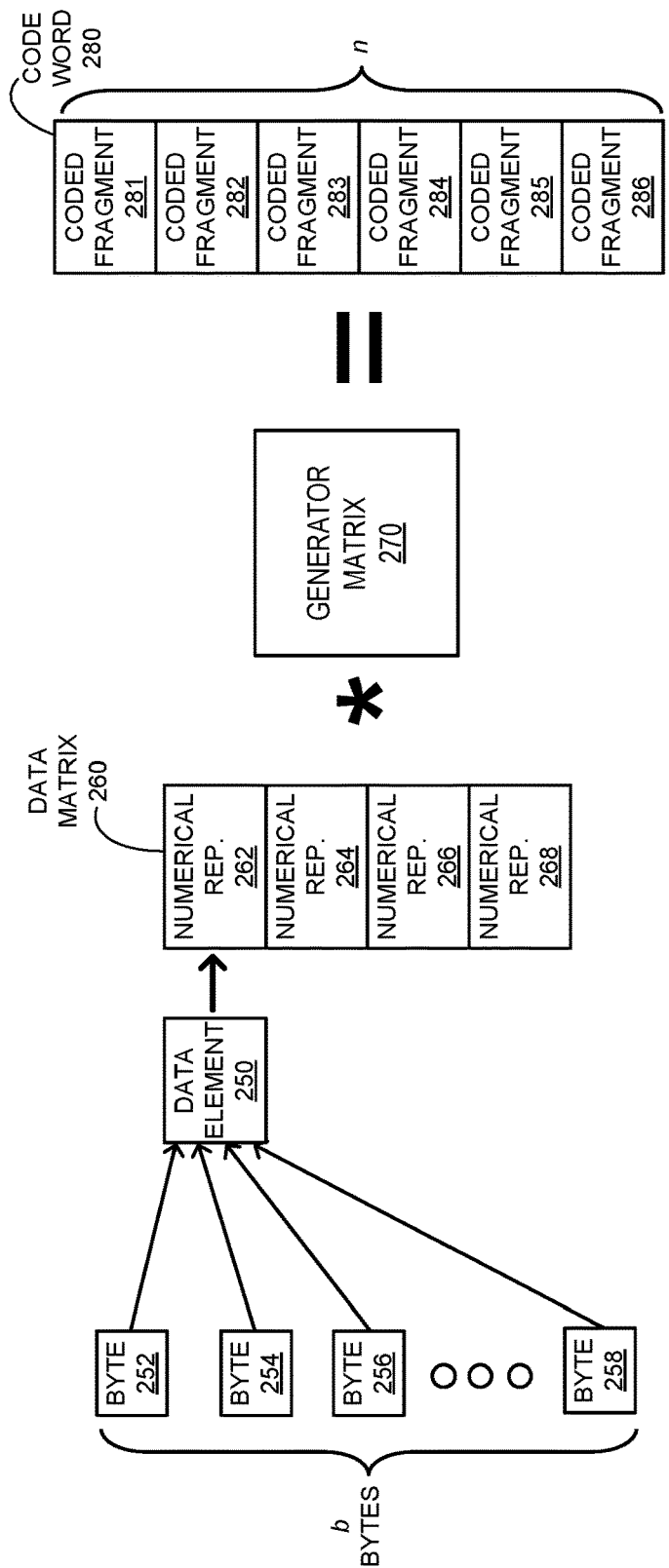
FIG. 2 illustrates exemplary numerical operation-based erasure coding for generating coded fragments of a respective sub-file, in accordance with an embodiment of the present invention.

FIG. 2 illustrates exemplary numerical operation-based erasure coding for generating coded fragments of a data segment, in accordance with an embodiment of the present invention. During operation, a storage management system determines how many bits a data element should include. For example, if a computing device includes a 64-bit processor and/or includes a 64-bit bus, the system can determine to include 64 bits or 8 bytes in a data element. In this example, the system includes b bytes, comprising bytes 252, 254, 256, and 258, from a data file in a data element 250.

The system then represents data element 250 in a numerical representation 262. For example, the system can convert the bits of data element 250 into a numerical data type. Such numerical data types can be a real number, an imaginary number, or a combination of real and imaginary numbers. In some embodiments, the system allocates a subset of bits of data element 250 as a set of padding bits to incorporate an overflow, if any, for the numerical operations performed on numerical representation 262. The system can determine an optimal number of padding bits based on the maximum value that an overflow resulting from the numerical operations on numerical representation 262 can take.

In the same way, the system generates numerical representations 264, 266, and 268. In some embodiments, generating the numerical representations includes one or more of: a Fourier transformation of the data element; and a computation of amplitude and phase of the data element. The system includes the padding bits in the corresponding data elements associated with numerical representations 264, 266, and 268. The system forms a data matrix 260 comprising numerical representations 262, 264, 266, and 268. In some embodiments, the system arranges the converted numerical representations 262, 264, 266, and 268, and corresponding padding bits into a matrix representation (i.e., data matrix 260) in system memory and/or processor cache registers.

The system can also determine a generator matrix 270 based on the size of the data matrix and the number of coded fragments to be generated. In some embodiments, the number of matrix elements in data matrix 260 can be determined by the dimension of generator matrix 270 such that data matrix 260 and generator matrix 270 can be multiplied. For example, if the number of coded fragments to be generated is six and the minimum number of coded fragments needed to recover the data elements is four, generator matrix 270 should be a 6-by-4 matrix. Under such circumstances, the data matrix should be a 4-by-1 matrix. The system then multiplies data matrix 260 and generator matrix 270 to generate code word 280, which includes coded fragments 281, 282, 283, 284, 285, and 286. The system may use a subset of these coded fragments to recover the original data.

The system selects generator matrix 270 in such a way that the overflow resulting from the multiplication is relatively small (i.e., can be represented by the padding bits). In some embodiments, the overflow is less than or equal to the maximum of the respective summation of each row of generator matrix 270. The summation can be the summation of the elements of a row, wherein the number of elements in a row is equal to the number of columns in generator matrix 270. In some embodiments, generator matrix 270 is for non-systematic erasure coding, which combines original data and parity data as encoded bits. This provides implicit data security by avoiding data in plaintext. For example, coded fragments 281, 282, 283, 284, 285, and 286 are not in plaintext. As a result, an individual coded fragment does not reveal any part of the original data.

This calculation may further be used to determine the minimum number of padding bits added to data element 250. The padding bits may vary depending on the input data size and number of fragments being generated. The fewer the padding bits, the more bits in data element 250 can be used to incorporate data from the data stream. For example, for a 64-bit computer, data element 250 can include 64 bits or 8 bytes. The system then can allocate seven bytes for data and one byte for padding bits. However, if the system determines that only four bits are needed to incorporate the overflow, the system can use an additional four bits to represent data. In some embodiments, only the data portion of data element 250 is represented in a numerical representation.

The multiplication between data matrix 260 and generator matrix 270 can include simple numerical operations, which are typically faster than linear arithmetic or table lookup operations used in Galois fields. Examples of numerical operations include, but are not limited to, addition, subtraction, multiplication, division, mix column, byte substitution, bit-shifting, and logical (AND, OR and XOR) operations. As a result, the numerical operation-based erasure coding uses fewer computing cycles, faster computation, and higher throughput for the storage systems.

Furthermore, a numerical representation can be more scalable. For example, Galois field operations are 8-bit operations while numerical representations can be 16, 32, 64, and 128 bits or more. As a result, numerical operation-based erasure coding results in higher speed and throughput. In addition, the system can use well-known techniques to optimize numerical operations associated with the matrix multiplication. Numerical operations can further benefit from hardware accelerations with vector instruction sets. If the computing system includes dedicated hardware support (e.g., Graphic Processing Units (GPU)), the system can select numerical data type and operations that can utilize such hardware.

To recover the original data, the system determines the minimum number of error-free coded fragments needed to retrieve the data elements. Suppose that the number of coded fragments is n and the minimum number of coded fragments needed to retrieve the data is k (wherein n>k). The system then selects k error-free coded fragments from the n coded fragments. Criteria for selecting the k error-free coded fragments from the n coded fragments include, but are not limited to, one or more of: first available error-free fragments, data location, storage and network transfer speed, and system load.

The system also determines an appropriate decoder matrix, whose elements can be real numbers. The matrix elements can also be fractions without repeating decimals that may cause rounding errors. The decoder matrix can be fixed for generator matrix 270 and the selected k coded fragments. For different k coded fragments, the corresponding decoder matrix can be pre-calculated from generator matrix 270. When needed, the system can retrieve the decoder matrix corresponding to the selected k coded fragments. The system multiplies the selected k coded fragments, which can be represented as a coded matrix, with the decoder matrix to generate the original data elements. The system can remove the padding bits from these data elements and convert the numerical representations into the original data file.

Furthermore, the system can determine whether one or more of the n coded fragments are unavailable. The system then determines the minimum number of error-free coded fragments needed to recover the unavailable coded fragments and selects them from the remaining coded fragments needed to recreate the unavailable coded fragments. The system also obtains a recovery matrix by inverting a sub-matrix, which corresponds to the selected m coded fragments, of generator matrix 270. The system then multiplies the selected coded fragments and the recovery matrix to reconstruct the unavailable coded fragments. It should be noted that this matrix multiplication can recover all unavailable coded fragments. In this way, the embodiments of the present invention can avoid a repeated recovery process for individual unavailable coded fragments.

Operations

Figure 3A:
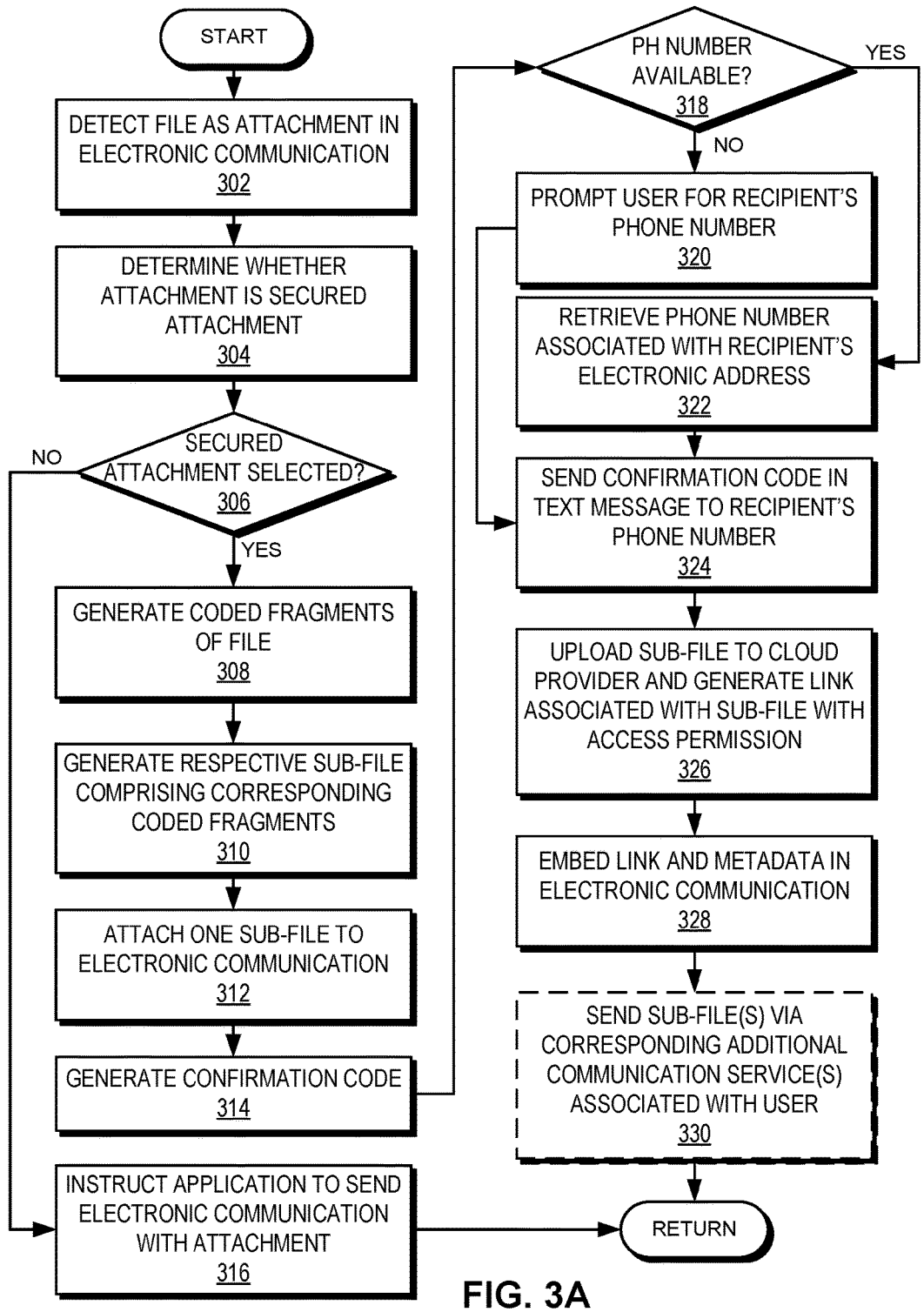
FIG. 3A presents a flowchart illustrating an exemplary process of a sender file sharing system sharing a file using multiple communication services, in accordance with an embodiment of the present invention.

FIG. 3A presents a flowchart illustrating an exemplary process of a sender file sharing system sharing a file using multiple communication services, in accordance with an embodiment of the present invention. During operation, the system detects a file as an attachment in an electronic communication (e.g., in an email or a chat message) (operation 302) and determines whether the attachment is a secured attachment (operation 304). For example, the system can prompt the user asking whether the attachment is a secured attachment. In some embodiments, the system determines an attachment to be secured by default. The system then checks whether the secured attachment has been selected for the attachment (operation 306). If the secured attachment has not been selected, the system instructs the application (e.g., an email or chat application) to send the electronic communication with the attachment (operation 316).

On the other hand, if the secured attachment has been selected, the system generates coded fragments of the file (operation 308) and generates a respective sub-file comprising the corresponding coded fragments (operation 310), as described in conjunction with FIG. 1C. The system attaches one sub-file to the electronic communication (operation 312) and generates a confirmation code (operation 314). The system determines whether the phone number of the user is available (e.g., in the address book) (operation 318). If not, the system prompts the user for the recipient's phone number (operation 320). Otherwise, the system retrieves the phone number associated with the recipient's electronic address (e.g., an email address or a chat handle) (operation 322).

Upon obtaining the recipient's phone number (operation 320 or 322), the system sends the confirmation code in a text message to the recipient's phone number (operation 324). The text message can be a cellular carrier's text message or a text message of a communication application (e.g., a WhatsApp or Viber text message). The system uploads another sub-file to a cloud provider and generates a link associated with access permission (operation 326), and embeds the link and associated metadata in the electronic communication (operation 328). The metadata can include one or more of: the number of sub-files, the number of coded fragments in a respective sub-file, and the communication technique for each sub-file. This metadata can be encrypted using a key. The system can, optionally, send the sub-file(s) via corresponding additional communication service(s) associated with the user (operation 330) (denoted with dashed lines), as described in conjunction with FIG. 1C.

Figure 3B:
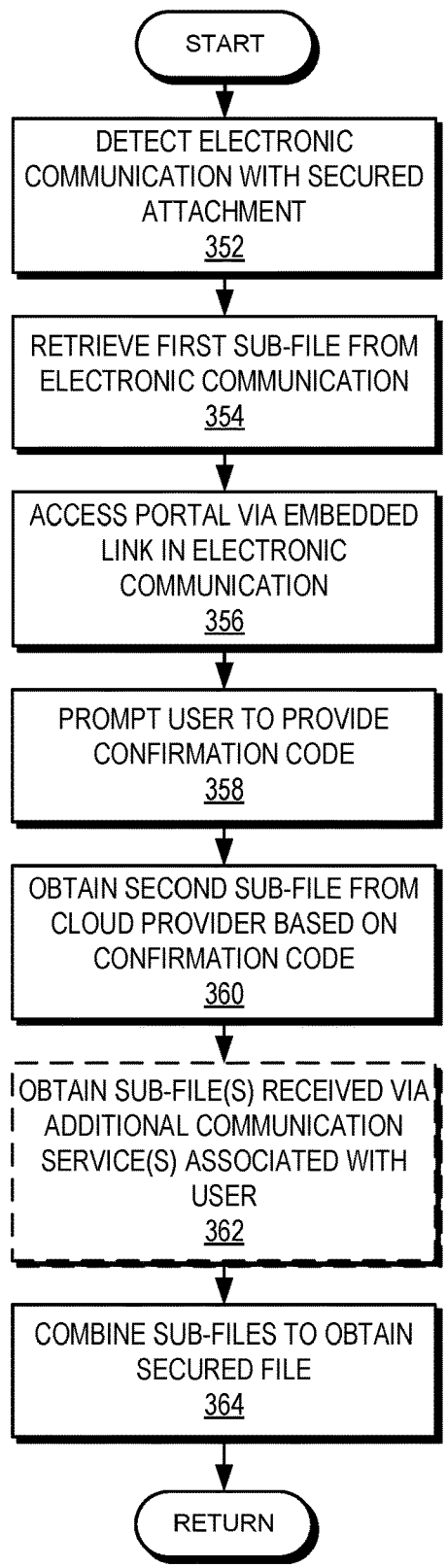
FIG. 3B presents a flowchart illustrating an exemplary process of a recipient file sharing system receiving a file using multiple communication services, in accordance with an embodiment of the present invention.

FIG. 3B presents a flowchart illustrating an exemplary process of a recipient file sharing system receiving a file using multiple communication services, in accordance with an embodiment of the present invention. During operation, the system detects an electronic communication with a secured attachment (operation 352) and retrieves a first sub-file from the electronic communication (operation 354). The system also accesses a portal via the embedded link in the electronic communication (operation 356) and prompts the user to provide the confirmation code (operation 358). The system then obtains a second sub-file from a cloud provider based on the confirmation code (operation 360), as described in conjunction with FIG. 1B. The system can, optionally, obtain sub-file(s) received via additional communication services(s) associated with the user (operation 362) (denoted with dashed lines). The system combines the sub-files to obtain the secured file (operation 364).

Figure 4A:
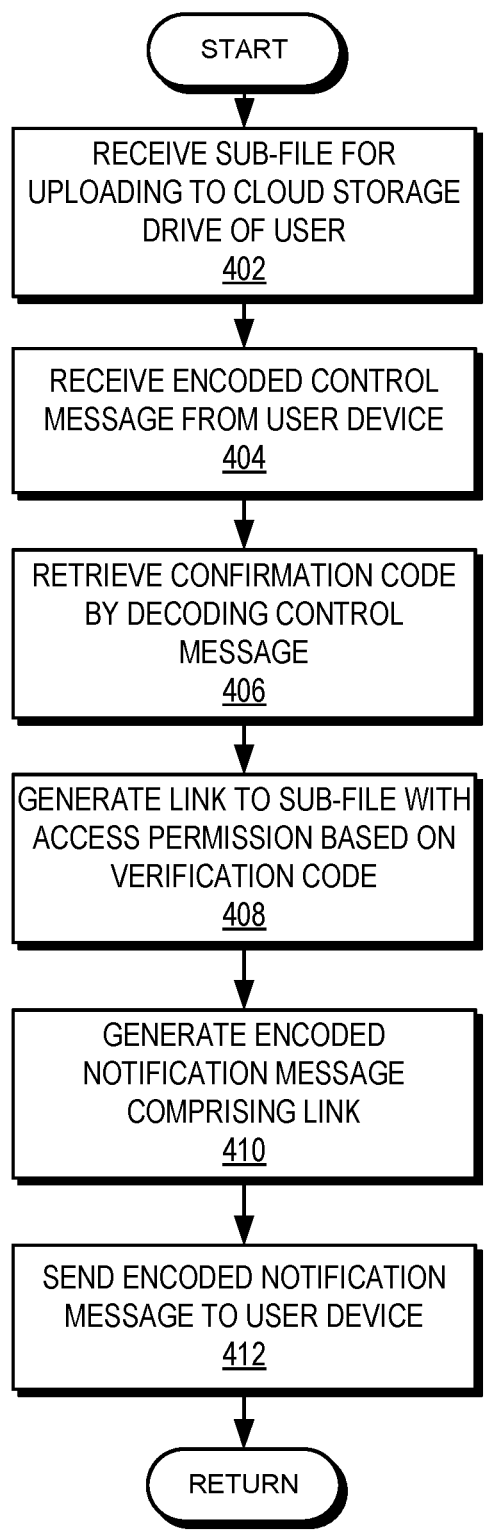
FIG. 4A presents a flowchart illustrating an exemplary process of a cloud provider obtaining a sub-file for sharing from a sender file sharing system, in accordance with an embodiment of the present invention.

FIG. 4A presents a flowchart illustrating an exemplary process of a cloud provider obtaining a sub-file for sharing from a sender file sharing system, in accordance with an embodiment of the present invention. During operation, the cloud provider receives a sub-file for uploading to the cloud storage drive of the user (operation 402) and receives a control message from a user device (operation 404). The cloud provider retrieves the confirmation code by decoding the control message (operation 406) and generates a link to the sub-file with access permission based on the verification code (operation 408). The cloud provider generates an encoded notification message comprising the link (operation 410) and sends the encoded message to the user device (operation 412).

Figure 4B:
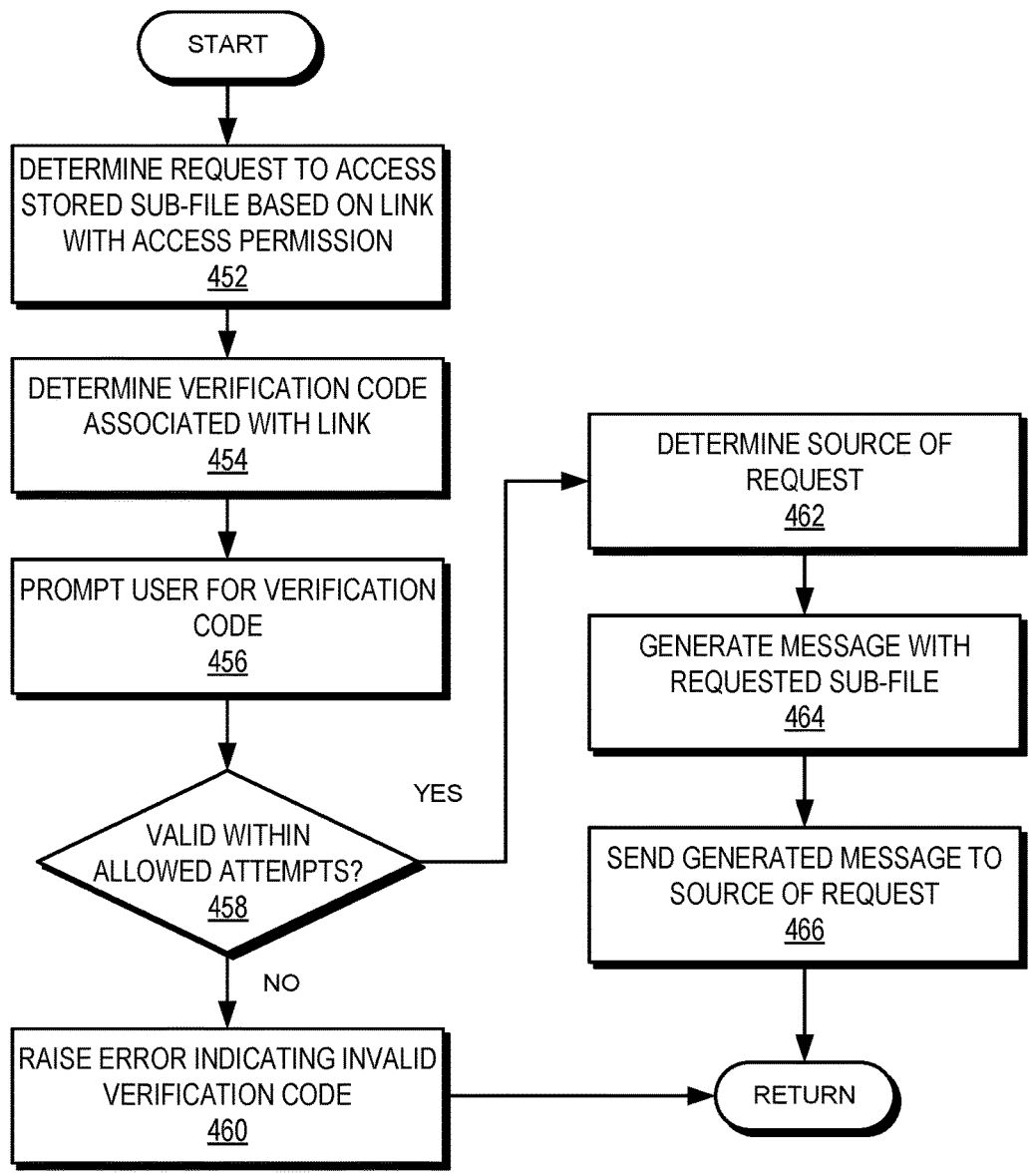
FIG. 4B presents a flowchart illustrating an exemplary process of a cloud provider providing a sub-file to a recipient file sharing system, in accordance with an embodiment of the present invention.

FIG. 4B presents a flowchart illustrating an exemplary process of a cloud provider providing a sub-file to a recipient file sharing system, in accordance with an embodiment of the present invention. During operation, the cloud provider determines a request to access the stored sub-file based on the link with access permission (operation 452) and determines a verification code associated with the link (operation 454). The cloud provider prompts the user for the verification code (operation 456). The cloud provider determines whether a valid verification code is provided within the allowed number of attempts (operation 458) (e.g., the user must provide a verification code within three attempts).

If a valid verification code is provided within the allowed number of attempts, the cloud provider determines a source of the request (operation 462). This source can be determined based on identifying information of a recipient file sharing system. The cloud provider then generates a message with the requested sub-file (operation 464) and sends the generated message to the source of the request (operation 466). On the other hand, if a valid verification code is not provided within the allowed number of attempts, the cloud provider raises an error indicating an invalid verification code (operation 460).

Exemplary Computer and Communication System

Figure 5:
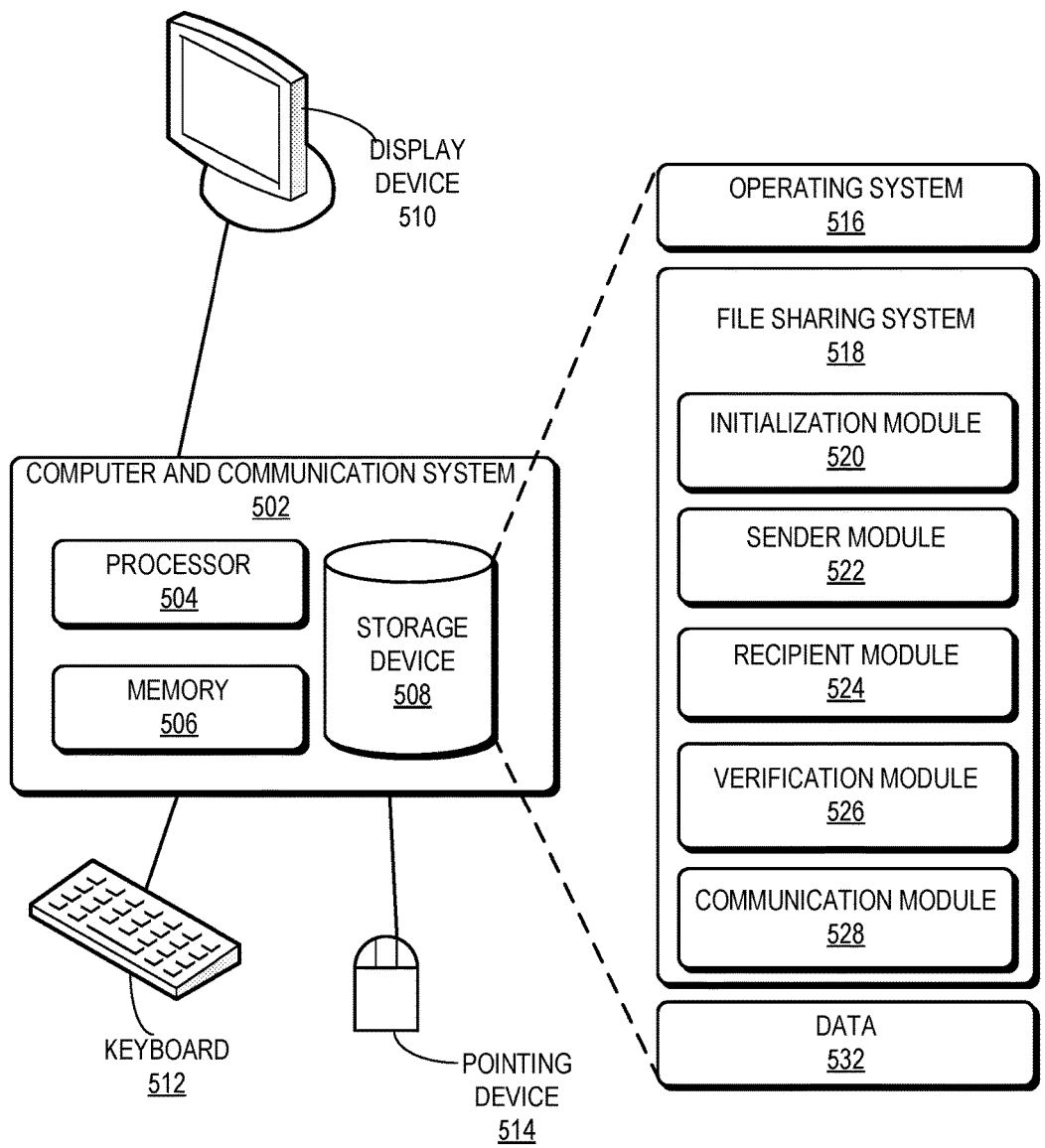
FIG. 5 illustrates an exemplary computer and communication system facilitating a file sharing system that provides secure file sharing using multiple communication services, in accordance with an embodiment of the present invention.

FIG. 5 illustrates an exemplary computer and communication system facilitating a file sharing system that provides secure file sharing using multiple communication services, in accordance with an embodiment of the present invention. A computer and communication system 502 includes a processor 504, a memory 506, and a storage device 508. Memory 506 can include a volatile memory (e.g., RAM) that serves as a managed memory, and can be used to store one or more memory pools. Furthermore, computer and communication system 502 can be coupled to a display device 510, a keyboard 512, and a pointing device 514. Storage device 508 can store an operating system 516, a file sharing system 518, and data 532.

File sharing system 518 can include instructions, which when executed by computer and communication system 502, can cause computer and communication system 502 to perform the methods and/or processes described in this disclosure. File sharing system 518 includes instructions for initializing file sharing system 518 on computer and communication system 502 (initialization module 520), as described in conjunction with FIGS. 1A and 1B. File sharing system 518 also includes instructions for determining the number of coded fragments, the number of sub-files, and the communication techniques (initialization module 520), as described in conjunction with FIG. 1C.

File sharing system 518 also includes instructions for generating the sub-files of a file and sending them to a recipient device using a plurality of communication techniques (sender module 522), as described in conjunction with FIGS. 3A and 4A. File sharing system 518 further includes instructions for obtaining the sub-files via a plurality of communication techniques and reconstructing the file (recipient module 524), as described in conjunction with FIGS. 3B and 4B. File sharing system 518 also includes instructions for generating and sending a verification code to a recipient's cell phone (verification module 526). File sharing system 518 can also include instructions for exchanging information between instances of the file sharing systems (communication module 528). Data 532 can include any data that is required as input or that is generated as output by the methods and/or processes described in this disclosure.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating secure file sharing, comprising:
    identifying, by a first device of a first user, a data file to be sent to a second device of a second user;
    generating a plurality of coded fragments from the data file based on a generator matrix of erasure encoding, wherein a respective coded fragment of the plurality of coded fragments does not include plaintext data of the data file;
    generating a plurality of sub-files of the data file, wherein a respective sub-file comprises one or more coded fragments;
    attaching a first sub-file of the plurality of sub-files to an electronic communication destined to the second device;
    uploading a second sub-file of the plurality of sub-files to a cloud provider;
    embedding a link associated with the uploaded second sub-file into the electronic communication, wherein the link is protected based on a verification code;
    sending the electronic communication to the second device; and
    sending the verification code in a text message to a cell phone of the second user.

2. The method of claim 1, wherein the electronic communication is one of: an electronic mail (email) and a chat message.

3. The method of claim 1, further comprising determining a number of sub-files based on a number of communication techniques used to share the data file.

4. The method of claim 1, further comprising discarding one or more coded fragments based on a minimum number of coded fragments needed to reconstruct the data file.

5. The method of claim 1, wherein generating the plurality of coded fragments from the data file includes:
    obtaining a plurality of data elements from the data file;
    converting a respective data element in the plurality of data elements to a numerical representation;
    representing the numerical representations as a data matrix; and
    multiplying the data matrix with the generator matrix.

6. The method of claim 1, further comprising maintaining a mapping between an address of the second user and the cell phone number.

7. The method of claim 6, further comprising attaching a third sub-file of the plurality of sub-files to a chat message destined to a user account of the second user, wherein the mapping further comprises the user account.

8. The method of claim 1, further comprising determining a number of coded fragments for a respective sub-file based on a size of a file allowed by a corresponding communication technique.

9. The method of claim 1, wherein the electronic communication further comprises metadata encrypted by a key, wherein the metadata includes one or more of: a number of sub-files, a number of coded fragments in a respective sub-file, and a communication technique for a respective sub-file.

10. The method of claim 1, further comprising:
    determining whether the data file is selected as an attachment from an application facilitating the electronic communication; and
    in response to determining that the data file is selected as an attachment, launching a second application facilitating the secure file sharing as a companion application.

11. A method for facilitating secure file sharing, comprising:
    obtaining, by a first device of a first user, a first sub-file of a data file from an electronic communication sent from a second device of a second user, wherein the first sub-file represents a portion of the data file;
    identifying a link associated with a second sub-file of the data file from the electronic communication, wherein the second sub-file is uploaded to a cloud provider, and wherein the link is protected based on a verification code;
    obtaining the verification code from the first user, wherein the verification code is sent to a cell phone number of the first user;
    obtaining the second sub-file from the cloud provider by providing the verification code to a portal, wherein the link leads to the portal;
    retrieving a plurality of coded fragments of the data file from the first and second sub-files, wherein the plurality of coded fragments are generated from the data file based on a generator matrix of erasure encoding, and wherein a respective coded fragment of the plurality of coded fragments does not include plaintext data of the data file; and
    reconstructing the data file from the plurality of coded fragments based on a decoder matrix of the erasure encoding, wherein the decoder matrix is determined based on the generator matrix used to generate the plurality of coded fragments.

12. The method of claim 11, wherein the electronic communication is one of: an electronic mail (email) and a chat message.

13. The method of claim 11, wherein reconstructing the data file comprises:
    determining matrix elements associated with the plurality of coded fragments;
    determining the decoder matrix by forming the sub-matrix of the generator matrix based on a transformation of the determined matrix elements; and
    multiplying the decoder matrix with a data matrix comprising the plurality of coded fragments.

14. The method of claim 11, further comprising obtaining a third sub-file of the data file from a chat message destined to a user account of the first user.

15. The method of claim 11, wherein the electronic communication further comprises metadata encrypted by a key, wherein the metadata includes one or more of: a number of sub-files, a number of coded fragments in a respective sub-file, and a communication technique for a respective sub-file.

16. The method of claim 11, further comprising:
    determining whether the first sub-file is selected for downloading from an application facilitating the electronic communication; and
    in response to determining that the first sub-file is selected for downloading, launching a second application facilitating the secure file sharing as a companion application.

17. The method of claim 11, wherein the portal is one of:
    a plug-in of the cloud provider, wherein the plug-in is configured to verify the verification code for the second sub-file; and
    a web portal running on a web server, wherein the web portal is configured to forward a download request for the second sub-file to the cloud provider in response to verifying the verification code.

18. The method of claim 11, wherein the verification code is associated with an expiration time.

19. A computer system operating as a first device of a first user, the computer system comprising:
- a processor; and
- a storage device storing instructions that when executed by the processor cause the processor to perform a method, the method comprising:
  - identifying, by the computer system, a data file to be sent to a second device of a second user;
  - generating a plurality of coded fragments from the data file based on a generator matrix of erasure encoding, wherein a respective coded fragment of the plurality of coded fragments does not include plaintext data of the data file;
  - generating a plurality of sub-files of the data file, wherein a respective sub-file comprises one or more coded fragments;
  - attaching a first sub-file of the plurality of sub-files to an electronic communication destined to the second device;
  - uploading a second sub-file of the plurality of sub-files to a cloud provider;
  - embedding a link associated with the uploaded second sub-file into the electronic communication, wherein the link is protected based on a verification code;
  - sending the electronic communication to the second device; and
  - sending the verification code in a text message to a cell phone of the second user.

20. The computer system of claim 19, wherein the method further comprises attaching a third sub-file of the plurality of sub-files to a chat message destined to a user account of the second user.

* * * * *